Jan. 26, 1932. R. CASE 1,842,713
ATTACHMENT FOR AGRICULTURAL MACHINES
Filed May 12, 1931 3 Sheets-Sheet 2
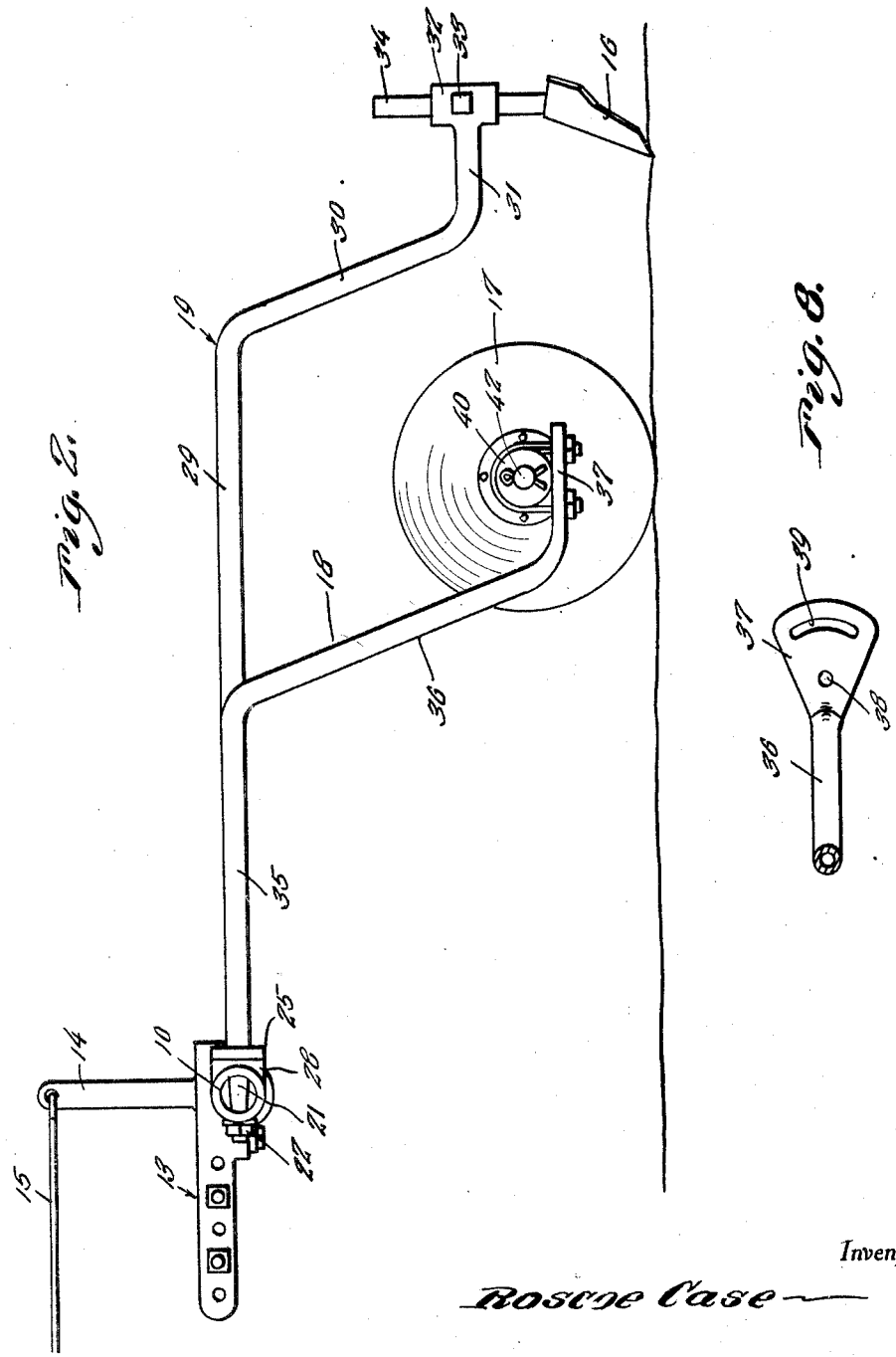
Inventor
Roscoe Case
By Clarence A. O'Brien
Attorney Jan. 26, 1932.  R. CASE  1,842,713
ATTACHMENT FOR AGRICULTURAL MACHINES
Filed May 12, 1931  3 Sheets-Sheet 3

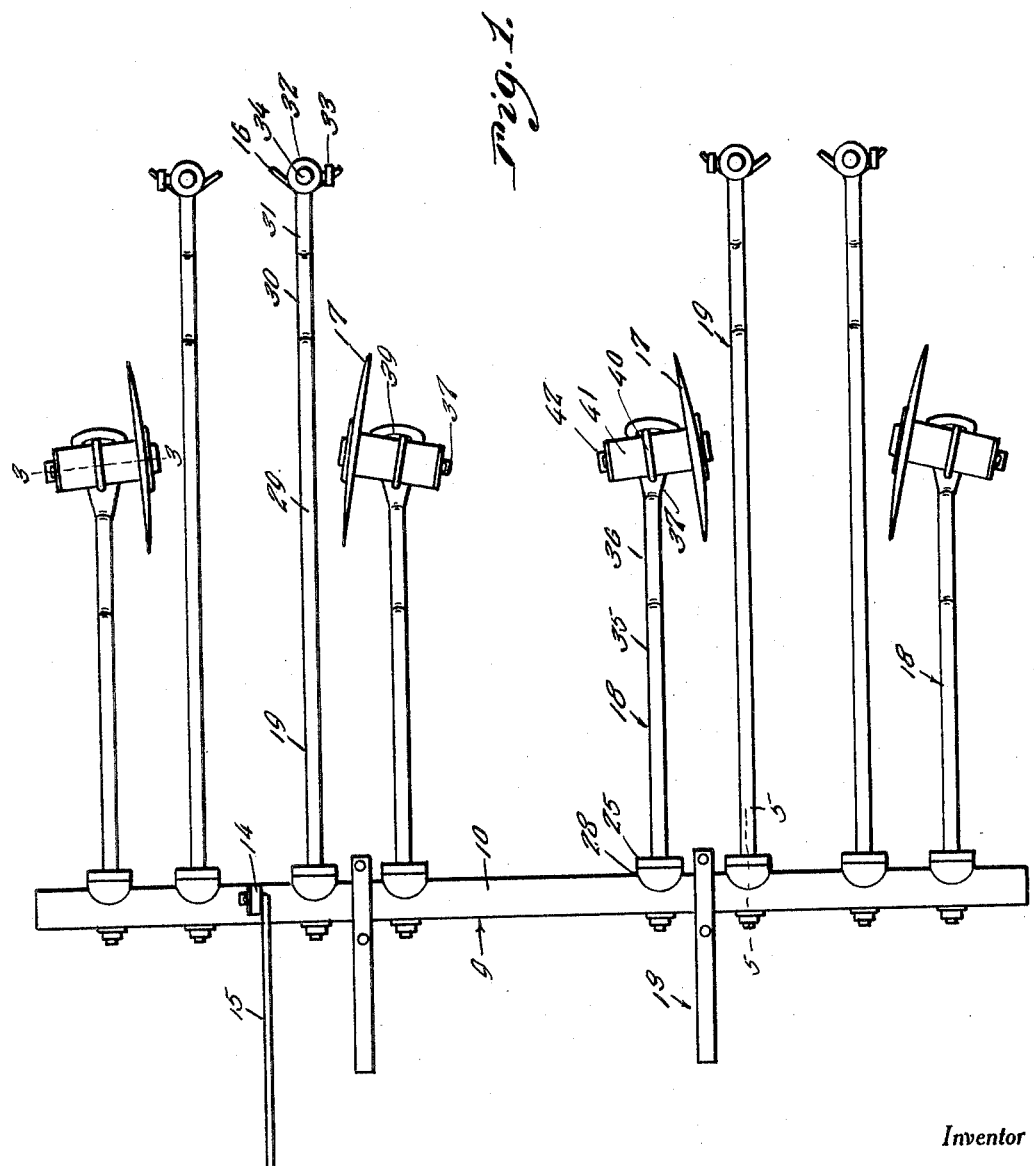

Inventor

Roscoe Case

By Clarence A. O'Brien
Attorney

Patented Jan. 26, 1932

1,842,713

UNITED STATES PATENT OFFICE

ROSCOE CASE, OF HAMBURG, IOWA

ATTACHMENT FOR AGRICULTURAL MACHINES

Application filed May 12, 1931. Serial No. 536,841.

This invention relates to an improved attachment for agricultural machines, the preferred embodiment thereof being in the nature of an attachment susceptible of expeditious attachment to a tractor of the Farmall or similar type.

The machine is generally referred to as a corn plow, inasmuch as it is especially useful in conditioning a field for corn planting. The machine is characterized by a plurality or gang of cultivator discs arranged in longitudinally spaced pairs with intervening pairs of shovels forming the plows proper.

One feature of novelty is predicated upon a simple and economical pipe which constitutes a rocker shaft, the same being journalled for oscillation in bearings, and said bearings being carried by a pair of clamping devices susceptible of dependable and expeditious connection to a conventional type of power supply tractor.

A further feature of novelty is predicated upon the carriers for the discs and shovels wherein each carrier is in the nature of an especially bent and shaped rod, said rod being attached to the rocker shaft by special coupling means capable of selective adjustment whereby to permit the individual discs and shovels to be adjusted to the desired angular position with respect to the line of draft.

A still further feature of the invention is the special end construction of the carriers provided for suspension of the cultivator discs, the construction being such as to allow the discs to be adjusted laterally with respect to the longitudinal axis of the companion carrier.

Other features and advantages will become more readily apparent from the following description and the drawings.

In the drawings:

Figure 1 is a top plan view of the general assembly constituting the complete attachment ready for operative connection to a tractor (not shown).

Figure 2 is an end or side elevational view of the structure observed in Figure 1.

Figure 8 is a plan view of the end construction of the special carrier for the cultivator discs.

Figure 5:
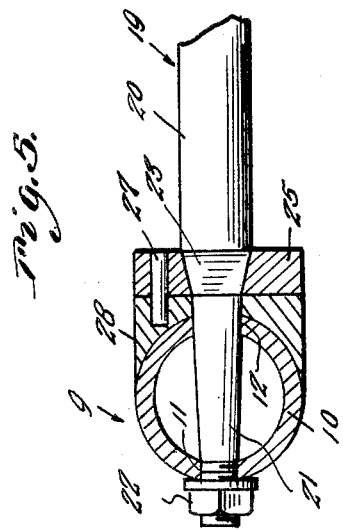
Figure 5 is a section on the line 5—5 of Figure 1.

Referring now to the drawings in detail, it will be observed that the rocker shaft 9 is in the nature of a single length of pipe 10, the same being formed at longitudinally spaced points with diametrically opposed pairs of apertures, the front aperture, seen in Figure 5, being denoted by the numeral 11, and the rear aperture by the numeral 12. The rear aperture 12 is tapered.

The numerals 13 designate the attaching devices or clamps. These are of suitable construction to permit attachment to a conventional tractor of the Farmall type, and each clamp is formed with a bearing bracket in which the adjacent portion of the shaft 9 is mounted for limited oscillation. Incidently, the shaft is provided with an upstanding arm 14 serving as a rocker and attached to this is an operating member 15.

The appurtenances attached to and extending rearwardly from the shaft are distinguished as shovels and discs. The shovel is denoted by the numeral 16 and is of appropriate construction. The disc is represented by the numeral 17. The shovels are arranged in pairs as shown in Figure 1, between pairs of the discs.

There are two sets of discs and two sets of shovels, these being arranged in quartet relationship as represented in Figure 1. The disc carriers are indicated by the numerals 18 and the plow or shovel carriers are indicated by the numerals 19. It will be noted by way of comparison that the carriers 18 are somewhat shorter than the carriers 19. The means for connecting the various carriers to the rock shaft is the same in each instance, and each means is in the nature of a special adjusting and retaining device.

For example, as shown in Figure 5, the forward end of the carrier rod 20 is tapered and cylindrical in cross section as indicated at 21 and has its threaded end extending through and beyond the aperture 11 and provided with a retaining nut 22. The enlarged part of this tapered extremity 21 extends rearwardly through and beyond the hole 12 and adjacent this point the rod is formed with flat faces as indicated at 23.

Figure 6:
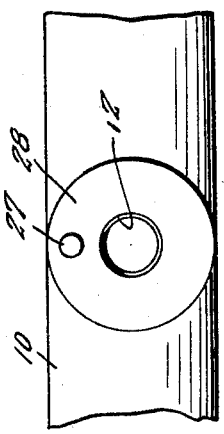
Figure 6 is a detail fragmentary elevational view with certain of the parts removed for clearness of illustration.
Figure 7:
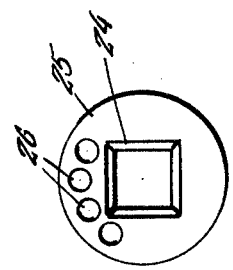
Figure 7 is a detail view of an adjusting and retaining washer.

In other words, the portion 23 is polygonal in cross section. The portion 23 of the rod is adapted for co-operation with a square opening 24 formed in the adjusting washer 25 as shown in Figure 7. Near the top and close to the periphery the washer is provided with circumferentially spaced holes 26 which cooperate with a keeper pin indicated at 27 in Figures 5 and 6 formed integrally on the marginal portion of the end thrust washer or abuttment 28.

It will be noticed in Figure 5 that the front face of this special thrust washer 28 is provided with a concavity to conform to and partly embrace the adjacent surface of the shaft 9. This arrangement of features permits axial adjustment of the rod 20 whereby it is possible to vary and set the angularity of either the discs or shovels with respect to the line of draft.

To accomplish this result, all that is necessary is to loosen the nut 22, to withdraw the tapered spindle 21 so as to disengage the washer 25 from the companion thrust washer 28. It is necessary however to separate the washers sufficiently to allow the keeper hole 26 to clear the keeper pin 27. Then the rod is rotated either one way or the other to the degree desired and the parts replaced, at which time the pin 27 is selectively engaged with the proper keeper hole 26. Then the nut 22 is tightened to maintain the parts in the coupled state represented in Figure 5.

Referring to Figure 2 it will be observed that each carrier 19 includes a horizontal portion 29, a rearwardly inclined downwardly disposed portion 30 and a horizontal terminal 31 formed with a socket 32. The socket carries the set screw 33 and these features 32 and 33 serve to accommodate the shank 34 of the blade of the shovel 16. Thus the shovel can be raised or lowered and bodily lifted through the arcuate swinging action of the carrier and oscillatory adjustment of the shaft 9 on which the carrier is mounted.

In addition, axial adjustment of the carrier can be made in the manner already described to vary the side tilt or angularity of the shovel with respect to the line of draft.

Figure 3:
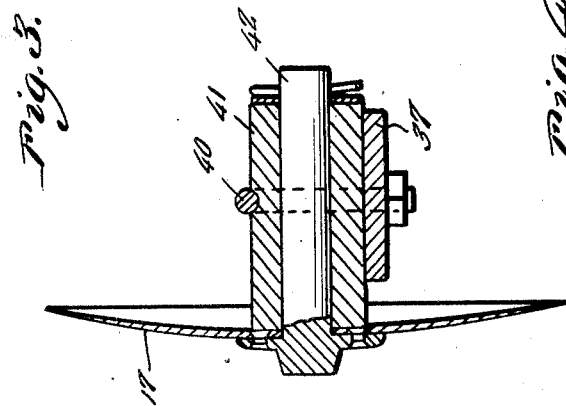
Figure 3 is an enlarged detail fragmentary section on the line 3—3 of Figure 1.
Figure 4:
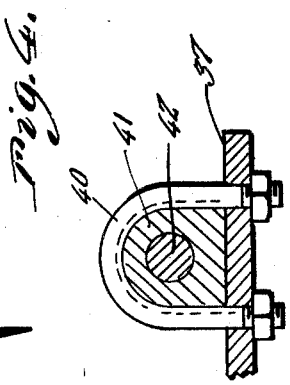
Figure 4 is a similar sectional view taken at right angles to Figure 3.

The carrier 18 in addition to being slightly shorter than the carrier 19 includes a front horizontal portion 35, a rearwardly and downwardly inclined portion 36 and a short horizontal portion which is flattened and of fan-shaped configuration in top plan view as indicated in Figure 8 and represented by the numeral 37. This portion 37 has a pivot hole 38 in an arcuate slot 39 to accommodate the arms of the U-shaped adjusting and retaining clip 40. This clip as shown in Figures 3 and 4 fits into a groove in the intermediate portion of the bearing 41.

The bearing is constructed to accommodate the axle 42 of the disc 17. The disc therefore has additional adjustment in addition to the various adjustments of the aforesaid shovel. In other words, the disc can be adjusted in a limited arc determined by the clip 40 and slot 59, said adjustment being in a horizontal plane to vary the position of the disc with respect to the line of draft.

It is thought that the description taken in connection with the drawings will enable a clear understanding of the invention. Therefore, a more lengthy description is thought unnecessary.

While the preferred embodiment of the invention has been shown and described, it is to be understood that minor changes coming within the field of this invention claimed may be resorted to if desired.

I claim:

1. A tractor attachment of the class described, comprising bearing equipped attaching clamps, a shaft mounted for rotation in the bearings of said clamps, a carrier rod extending at right angles to the shaft and having axially rotatable clamping connection at its forward end with said shaft, the rear end of said rod being formed with a fan-shaped terminal having a pivot hole and an arcuate adjusting slot, a bearing seated on said fan-shaped terminal, a disc, an axle carried by said disc and mounted for rotation in said bearing, the bearing being formed intermediate its ends with a groove, and a U-shaped clip seated in said groove and having one arm mounted for pivotal movement in said pivot hole and the remaining arm mounted for arcuate adjustment in said slot, whereby to permit the bearing to be shifted to change the position of the disc with respect to the line of draft.

2. In a structure of the class described, a rockshaft in the form of a pipe and having a pair of diametrically located holes, one hole being tapered, a plow carrier rod having its body portion of cylindrical cross section and having its forward end tapered and cylindrical in cross section and constituting a connecting and adjusting spindle, said spindle extending through said diametrically opposite holes and having a screw-threaded terminal provided with a clamping nut, that portion of the rod between the spindle and body portion being tapered and polygonal in cross section, and a pair of companion washers arranged between the body portion of the rod and said shaft.

3. In a structure of the class described, a rockshaft in the form of a pipe and having a pair of diametrically located holes, one hole being tapered, a plow carrier rod having its body portion of cylindrical cross section and having its forward end tapered and cylindrical in cross section and constituting a connecting and adjusting spindle, said spindle extending through said diametrically opposite holes and having a screw-threaded terminal provided with a clamping nut, that portion of the rod between the spindle and body portion being tapered and polygonal in cross section, and a pair of companion washers arranged between the body portion of the rod and said shaft, the rear washer having a square hole to accommodate the correspondingly shaped portion of the rod, the front washer having a tapered circular hole to accommodate the spindle, said forward washer being provided with a cavity embracing and conforming to the adjacent surface of the shaft.

4. In a structure of the class described, a rockshaft in the form of a pipe and having a pair of diametrically located holes, one hole being tapered, a plow carrier rod having its body portion of cylindrical cross section and having its forward end tapered and cylindrical in cross section and constituting a connecting and adjusting spindle, said spindle extending through said diametrically opposite holes and having a screw-threaded terminal provided with a clamping nut, that portion of the rod between the spindle and body portion being tapered and polygonal in cross section, and a pair of companion washers arranged between the body portion of the rod and said shaft, the rear washer having a square hole to accommodate the correspondingly shaped portion of the rod, the front washer having a tapered circular hole to accommodate the spindle, said forward washer being provided with a cavity embracing and conforming to the adjacent surface of the shaft, said forward washer being further provided with a keeper pin and the marginal portion of said rear washer having circumferentially spaced keeper holes for selective reception of the pin, whereby to provide a detachable connection between the rod and shaft, and to allow adjustment of the rod axially with respect to the shaft.

In testimony whereof I affix my signature.

ROSCOE CASE.